United States Patent Office 2,750,353
Patented June 12, 1956

2,750,353

PETROLEUM RESINS BY AFTER-TREATMENT WITH DIOLEFINS

Stanley B. Mirviss, Roselle, and Fred W. Banes, Westfield, N. J., assignors to Esso Research and Engineering Company, a corporation of Delaware No Drawing. Application December 31, 1952,
Serial No. 329,104

9 Claims. (Cl. 260—45.5)

This invention relates to a novel process for improving the quality of petroleum hydrocarbon resins, and, more particularly, to a process in which petroleum resins are improved by the addition of limited amounts of a diolefin, specifically those of the aliphatic or alicyclic types, to the reaction mixture under critical conditions.

Hydrocarbon resins can be produced from certain petroleum refinery streams containing olefins and diolefins by such methods as polymerization using Friedel-Crafts catalysts. The steam cracked streams have been found especially useful for this purpose.

It has now been found, however, that if a relatively minor quantity of a diolefin including particularly, a conjugated $C_5$ to $C_6$ alicyclic and branched chain aliphatic diolefins, specifically isoprene, or a cyclic diolefin such as cyclopentadiene, or methylcyclopentadiene, or mixtures thereof is added to the reaction mixture, improved resin yields are obtained and the resin yields so obtained have higher softening points than are realized when the diolefins are not added to the reaction mixture. The resin products are substantially soluble, that is, they contain substantially no insoluble gel. In order to achieve these improved effects, it is necessary and critical that the diolefin be added to the reaction mixture, after the major portion or all of the aluminum halide catalyst has been added. If the diolefin material in concentrations greater than about 3.5 wt. percent is added to or is present in the reaction mixture initially as part of the entire hydrocarbon feed, inferior yields are insoluble, gel-containing products are obtained.

Hydrocarbon resins to which the present invention is applicable are made by treating a hydrocarbon mixture containing diolefins, olefins, aromatics, paraffins, and naphthenes with 0.25% to 2.0% based on the unsaturated hydrocarbon feed of an aluminum halide catalyst such as aluminum chloride and aluminum bromide. The catalysts may be used as solids or they may be employed as solutions, slurries or complexes. Hydrocarbon complexes of the catalysts, obtained by reaction of the aluminum halide with a resin raffinate for example one containing about 60% olefins and 40% aromatics, are also quite useful.

Typical hydrocarbon fractions useful for feeds in making these resins boil from 20° to 170° C. Analyses show the following composition:

Distillation range:

| Fractions, ° C.— | Weight, percent |
|---|---|
| 20–70 | 0–60 |
| 70–130 | 65–40 |
| 130–170 | 35–0 |

Composition:

| | |
|---|---|
| Diolefins | 8–20 |
| Aromatics | 19–49 |
| Olefins | 68–30 |
| Paraffins and naphthenes | 5–1 |

The hydrocarbon stream used as feed stocks should be one from which substantially all the isoprene-containing cut has been removed, since the presence of this total cut during polymerization increases the amount of undesirable liquid polymer product.

The polymerization reactions are conducted at temperatures in the range of −30 to +75° C., and preferably from −15° to +60° C. Residual catalyst is quenched by suitable methods, such as addition of methyl alcohol and subsequent filtration, or by water and/or caustic washing. The final solution is then stripped of unreacted hydrocarbons and low molecular weight oils by vacuum or steam distillation. A hydrocarbon mixture suitable for resin production is conveniently found in selected hydrocarbon streams obtained by steam cracking gas oils. These cracked streams have boiling ranges between 20° and 170° C., or may be composed of any intermediate fraction selected from this range.

The invention consists of adding to the reaction mixture after substantially all of the catalyst has been added, only minor quantities of a diolefin or cyclic diolefin. When the reactions are carried out at 0° C. or lower, it is desirable to dilute the reaction mixture with an inert diluent as n-hexane prior to the addition of the modifying diolefins. The diolefins most satisfactory for use are included in the class of conjugated $C_5$ and $C_6$ alicyclic and branched chain aliphatic diolefins. Mixtures of these materials may also be used. The quantity of diolefin or cyclic diolefin added to obtain the herein described improved properties and yield of the resin, depends somewhat on the composition of the original polymerization feed stream. Generally, from 5% to 20% of isoprene, cyclopentadiene or methylcyclopentadiene, based on the total naphtha and diolefins, is added. It is preferable to limit the cyclopentadiene concentration to 20% or less on the total feed since higher concentrations give highly reactive products which tend to cross-link when subjected to very high temperature stripping or resin molding operations. If desired, the modified resins can be thermally bodied to give resins of further improved softening point. Furthermore, this thermal bodying treatment is much milder than that usually employed to heat body petroleum resins to increase the softening point. A minimum of 5% is usually necessary to achieve the desired improvements.

The polymerization to prepare the resin is necessarily carried out in batch operation or in separate stages or continuously with the modifying diolefin or cyclic diolefin being added after the first stage of polymerization when substantially all the catalyst has been added. The reaction mixture containing the modifying diolefin is agitated at the initial, or even a slightly higher reaction temperature, until the polymerization reaction is essentially complete.

The essential features of the invention are illustrated by the following examples although it is not intended to limit the invention thereto.

EXAMPLE 1

A steam cracked distillate boiling largely in the range of 40 to 145° C. and containing about 8% diolefins, 30% aromatics, 60% olefins and 2% paraffins and naphthenes was polymerized with solid $AlCl_3$ or slurries of powdered $AlCl_3$ in n-hexane. In a series of runs, 1% $AlCl_3$ was employed; the catalyst being added to the reactor over a ½ to ¾ hour period. The temperature was maintained at 20–25° C. during the time of catalyst addition as well as for an additional ⅓ to ¾ hour reaction period following the catalyst addition. The reaction mixtures were quenched with 5% $H_2SO_4$ solution (aqueous) and then water washed. Finally, the washed resin solutions were stripped to a resin temperature of 260–280° C. at 3–6 mm. Hg to recover hard resinous products.

Various quantities of isoprene were added to the naphtha both before and after the catalyst addition as noted in the following Table I showing the data obtained.

*Table I*

| Weight Percent on Total Feed | | Time of Isoprene Addition | Weight Percent on Feed | | Resin Properties | | |
|---|---|---|---|---|---|---|---|
| Naphtha | Isoprene | | Resin | Insoluble Polymer (Gel) | Soft Pt., °C.[1] | Color[2] | Iodine Number[3] |
| 100 | ------ | ------------------ | 19.7 | None | 88 | 5 | 197 |
| 90 | 10 | Before AlCl₃ | 29.8 | 2.0 | 91 | 3 | 182 |
| 85 | 15 | Before AlCl₃ | 32.6 | 4.3 | 91 | 3 | 171 |
| 90 | 10 | After AlCl₃ | 34.0 | None | 92 | 4 | 169 |
| 85 | 15 | After AlCl₃ | 36.8 | None | 96 | 3 | -------- |

[1] Ring and ball method (ASTM E-28-51-T).
[2] Color of a solution of 1 g. resin per 67 ml. xylenes compared to Gardner color index.
[3] ASTM D-555-47.

These data show the advantage of adding the aliphatic diolefin after the catalyst; namely, that increased yields of completely soluble and higher softening point resin products are obtained.

EXAMPLE 2

A series of resins was prepared from a steam cracked distillate boiling in the range of about 35 to 135° C. and containing about 15% diolefins, 24% aromatics, 60% olefins and 1% paraffins and naphthenes. The procedure for preparing and working up the resinous products were the same as described in Example 1. In these runs, carried out at 25° C., both 1% and 2% AlCl₃ concentrations were employed, as noted in the following Table II, and varying quantities of cyclic and acyclic diolefins were added to the naphtha stream described above.

*Table II*

| Wt. Percent on Total Feed | | | Wt. Percent AlCl₃ | Time of Diolefin Add'n | Weight Percent on Hydrocarbon Feed | | Resin Properties | | |
|---|---|---|---|---|---|---|---|---|---|
| Naphtha | Isoprene | MCPD[1] | | | Resin | Gel | Soft. Pt., °C. | Color | Iodine Number |
| 100 | ------ | ------ | ------ | ------------------ | 32.2 | None | 90 | 3 | 192 |
| 90 | 10 | ------ | 1.0 | Before AlCl₃ | 39.4 | 4.1 | 93 | 4 | ------ |
| 90 | 10 | ------ | 2.0 | Before AlCl₃ | 40.5 | 4.3 | 95 | 5 | ------ |
| 85 | 15 | ------ | 1.0 | Before AlCl₃ | 38.1 | 10.3 | 97 | 4 | 168 |
| 90 | 10 | ------ | 1.0 | After AlCl₃ | 42.7 | None | 97 | 2 | ------ |
| 85 | 15 | ------ | 2.0 | After AlCl₃ | 47.5 | None | 98 | 3 | ------ |
| 93.5 | ------ | 6.5 | 1.0 | After AlCl₃ | 36.7 | None | 112 | 4 | 202 |

[1] Methylcyclopentadiene monomer.

These data further show that isoprene and cyclopentadiene monomers can be employed to improve substantially both the resin yields and softening points without encountering insoluble polymer formation. These data further show that these monomers must be added after the catalyst in order to achieve these desired results.

EXAMPLE 3

In another series of experiments, a naphtha feed was employed which boiled in the range of 35 to 140° C. and which contained about 14% diolefins, 36% aromatics, 49% olefins and 1% paraffins and naphthenes. Polymerizations were carried out using 1% AlCl₃ on the hydrocarbon feed, the catalyst being used both as the powdered material and as a 10% slurry in n-hexane. The reaction time and temperature and product work-up were substantially the same as described above in Example 1.

In these runs cyclopentadiene and methylcyclopentadiene monomers were added to the reactor both before and after completion of the catalyst addition to the basic reaction feed mixture.

*Table III*

| Wt. Percent on Total Feed | | | Time of Cyclodiolefin Add'n | Wt. Percent Yield of Soluble Resin | Gel Formation During Run | Resin Properties | | |
|---|---|---|---|---|---|---|---|---|
| Naphtha | CPD[1] | MCPD[2] | | | | Soft. Pt., °C. | Color | Iodine Number |
| 100 | ---- | ---- | ------------------ | 30.8 | No | 79 | 3 | 221 |
| 98 | ---- | 2 | Before AlCl₃ | 28.3 | Yes | 89 | 3 | 228 |
| 90 | ---- | 10 | Before AlCl₃ | 34.6 | Yes | 95 | ---- | ------ |
| 90 | 10 | ---- | Before AlCl₃ | 39.0 | Yes | 103 | 3 | ------ |
| 95 | ---- | 5 | After AlCl₃ | 31.6 | No | 95 | ---- | ------ |
| 90 | ---- | 10 | After AlCl₃ | 33.8 | No | 99 | 3 | 257 |

[1] Cyclopentadiene monomer.
[2] Methylcyclopentadiene monomer.

These data show that cyclodiolefin concentrations as low as 2% result in the formation of some insoluble resin product when the polymerization is carried out with AlCl₃. When added after the catalyst, equally good yields of high softening point resins are obtained without gel formation. The data show that the addition of cyclopentadiene monomer results in somewhat higher yields of resins but in both cases undesirable insoluble product is produced when the monomers are present in the initial feed.

EXAMPLE 4

A naphtha feed stream boiling in the range of 20 to 140° C. and containing about 18% diolefins, 20% aromatics, 60% olefins and 2% paraffins and naphthenes was employed in another series of runs. The reactions were carried out at 20–25° C. with 1% catalyst being added to the hydrocarbon feed over a ½ hour period. The time of isoprene addition was varied as was the type of catalyst employed in the runs. After completion of the catalyst addition and the addition of isoprene (if any), the reaction mixture was agitated at 45° C. for an additional one hour. At the end of this time, the reaction mixture was water washed thoroughly and then stripped to a bottoms temperature of 260° C. at 3–5 mm. Hg.

*Table IV*

| Wt. Percent on Total Feed | | Catalyst | Time of Isoprene Add'n | Wt. Percent Yield | | Resin Properties | |
|---|---|---|---|---|---|---|---|
| Naphtha | Isoprene | | | Resin | Gel | Soft. Pt., °C. | Color |
| 100 |  | AlCl₃ |  | 32.2 | None | 90 | 3 |
| 95 | 5 | AlCl₃ | Before AlCl₃ | 38.4 | 1.0 | 90 | 3 |
| 80 | 20 | AlBr₃ | Before AlBr₃ | Low | Very High |  |  |
| 80 | 20 | AlBr₃ | After AlBr₃ | 49.4 | None | 99 | 3 |

EXAMPLE 5

In still another series of polymerizations a naphtha feed stream was used which boiled in the range of about 35 to 135° C. The composition of the naphtha stream used was essentially the same as that described in Example 2. In each run the catalyst was added over a ½ hour period at the temperature shown in Table V and the reaction mixture was then agitated at this temperature for an additional ½ hour. In certain cases additions of cyclic or acyclic diolefins were made after completion of the catalyst addition and at the beginning of or during the final period of agitation.

*Table V*

| Weight Percent on Total Feed | | | | Reaction Temp., °C. | Wt. Percent AlCl₃ | Time of Diolefin Addition | Wt. Percent Yield | | Resin Properties | |
|---|---|---|---|---|---|---|---|---|---|---|
| Naphtha | Isoprene | CPD¹ | MCPD² | | | | Resin | Gel | Soft. Pt., °C. | Color |
| 100 |  |  |  | 20–25 | 1.0 |  | 35.6 | None | 87 | 2 |
| 80 | 20 |  |  | 60 | 0.5 | Before AlCl₃ | 47.2 | 12.0 | 101 | 2 |
| 90 | 10 |  |  | 0 | 2.0 | After AlCl₃ | 48.1 | None | 90 | 2 |
| 80 | 20 |  |  | 50–55 | 0.5 | After AlCl₃ | 49.2 | None | 102 | 2 |
| 80 |  | 20 |  | 50–55 | 0.5 | After AlCl₃ | 48.9 | None | 145 | 9 |
| 85 |  |  | 15 | 30 | ³1.5 | After AlCl₃ | 49.4 | None | 145 | 9 |
| ⁴85 |  | 15 |  | −15 | ³1.5 | After AlBr₃ | 45.8 | None | 148 | 9 |

¹ Cyclopentadiene.
² Methyl cyclopentadiene.
³ AlBr₃ used as catalyst.
⁴ Diluted with 40 vol. percent n-hexane based on original feed after catalyst addition and prior to diolefin addition.

These data show that by adding cyclodiolefins or isoprene to polymerizations after the catalyst, a large improvement in resin yields and softening point can be realized without also encountering undesirable gel formation. The invention is applicable over wide temperature ranges using both AlCl₃ and AlBr₃ as catalyst at concentrations as high as 2% on the hydrocarbon feed.

EXAMPLE 6

A naphtha stream boiling largely in the range of 70 to 170° C. (10% below 70° C.) and containing about 15% diolefins, 40% aromatics and 45% olefins was polymerized with 1% AlCl₃ at 25° C. and gave a 16.2% yield of a resin having a softening point of 80° C. This naphtha was subject to a large improvement with respect to resin yield and softening point by the addition of 10% of either isoprene or cyclopentadiene to the reaction mixture after completion of the catalyst addition. On the other hand, a naphtha of similar composition but boiling in the range of 170° to 260° gave a 25.5% yield of 110° C. softening point resin when treated with 1% AlCl₃ at 25° C. The resin yield and softening point in this case are at desirably high levels and do not require the additions of modifying diolefins to produce usable products.

What is claimed is:

1. A process for improving the quality and yield of unsaturated polymerized olefin-diolefin hydrocarbon resins which comprises treating a solution of previously polymerized unsaturated hydrocarbon resin before quenching and removal of catalyst residues with from 5% to 20% by weight, based on the final total amount of polymerization feed, of a hydrocarbon selected from the class consisting of C₅ to C₆ conjugated diolefins and cyclic diolefin.

2. A process according to claim 1 in which the cyclic diolefin is a conjugated C₅ to C₆ alicyclic diolefin.

3. Process according to claim 1 in which the catalyst is aluminum chloride; the hydrocarbon being isoprene.

4. A process according to that of claim 2 in which the diolefin is cyclopentadiene.

5. A process according to that of claim 2 in which the diolefin is methylcyclopentadiene.

6. A catalytic process for raising the softening point and yield of an unsaturated polymerized olefin-diolefin hydrocarbon petroleum resin which comprises reacting with said resin polymerization reaction mixture at a temperature not exceeding about +75° C. and prior to completion of the polymerization reaction from 5% to 20%, based on the final total amount of polymerization feed, of a diolefin selected from the group consisting of an aliphatic branched chain C₅ to C₆ conjugated diolefin and a cyclic diolefin, and subsequently removing the catalyst from the resin formed.

7. A process according to that of claim 6 in which the diolefin is isoprene.

8. In a process for raising the softening point and yield of an unsaturated polymerized olefin-diolefin hydrocarbon resin obtained by polymerizing a steam cracked petroleum distillate boiling in the range of about 20° to 170° C. in the presence of 0.25 to 2.0% of an aluminum halide catalyst at a temperature of −30° to +75° C., the improvement which comprises adding at a temperature not exceeding about +75° C. from 5% to 20%, based on the final total amount of polymerization feed, of a hydrocarbon chosen from the class consisting of C₅ to C₆ conjugated diolefins and cyclic diolefin having from 5 to 6 carbon atoms to at least a partially polymerized reaction mixture of said resin after addition of the catalyst is substantially completed but before removal of said catalyst.

9. Process according to claim 8 in which the polymerization temperature is between about −15° C. to +60° C., the hydrocarbon being cyclopentadiene.

References Cited in the file of this patent

UNITED STATES PATENTS

| | | |
|---|---|---|
| 2,180,082 | Mueller-Cunradi et al. | Nov. 14, 1939 |
| 2,388,685 | Guss et al. | Nov. 13, 1945 |
| 2,475,234 | Gleason et al. | July 5, 1949 |
| 2,698,841 | McKay et al. | Jan. 4, 1955 |